US010821973B2

(12) United States Patent
Glebov et al.

(10) Patent No.: US 10,821,973 B2
(45) Date of Patent: Nov. 3, 2020

(54) NAVIGATION SYSTEM WITH PARKING FACILITY NAVIGATION MECHANISM AND METHOD OF OPERATION THEREOF

(71) Applicant: Telenav, Inc., Santa Clara, CA (US)

(72) Inventors: Alexander G. Glebov, San Jose, CA (US); Manuj Shinkar, Sunnyvale, CA (US); Ninad Pradeep Lanke, Milpitas, CA (US); Sarvesh Bansilal Devi, Milpitas, CA (US); Kok Wei Koh, Mountain View, CA (US); Po-Wen Chen, San Jose, CA (US); HaiPing Jin, Saratoga, CA (US); Yi-Chung Chao, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 199 days.

(21) Appl. No.: 16/241,568

(22) Filed: Jan. 7, 2019

(65) Prior Publication Data
US 2019/0210594 A1 Jul. 11, 2019

Related U.S. Application Data

(60) Provisional application No. 62/614,055, filed on Jan. 5, 2018.

(51) Int. Cl.
*B60W 30/06* (2006.01)
*G05D 1/02* (2020.01)
*G01C 21/34* (2006.01)
*G08G 1/0967* (2006.01)
*G08G 1/14* (2006.01)
(Continued)

(52) U.S. Cl.
CPC ......... *B60W 30/06* (2013.01); *G01C 21/3407* (2013.01); *G01C 21/3685* (2013.01); *G05D 1/0212* (2013.01); *G08G 1/096725* (2013.01); *G08G 1/096775* (2013.01); *G08G 1/096827* (2013.01); *G08G 1/143* (2013.01); *G08G 1/146* (2013.01); *G05D 2201/0213* (2013.01)

(58) Field of Classification Search
CPC ............... B60W 30/06; G01C 21/3407; G01C 21/3685; G05D 1/0212; G05D 2201/0213; G08G 1/096725; G08G 1/096775; G08G 1/096827; G08G 1/143; G08G 1/146
USPC .......................................................... 701/25
See application file for complete search history.

(56) References Cited

U.S. PATENT DOCUMENTS 9,911,084 B2    3/2018  Bryson et al.
10,032,368 B1*  7/2018  Thompson ......... G06Q 30/0284
(Continued)

FOREIGN PATENT DOCUMENTS

EP     3261074 A1    12/2017
WO  2015114592 A1     8/2015
WO  2018109772 A1     6/2018

*Primary Examiner* — Gertrude Arthur Jeanglaude
(74) *Attorney, Agent, or Firm* — Perspectives Law Group, Corp.

(57) ABSTRACT

A navigation system includes: a control unit configured to: receive a parking facility request for an autonomous vehicle operation of a user vehicle in a vehicle parking facility; retrieve a parking facility map for the vehicle parking facility, including facility information, for the vehicle parking facility, wherein the facility information includes intersection nodes; and generate a facility traversal route for the autonomous vehicle operation of the user vehicle through the vehicle parking facility based on the intersection nodes and the parking facility request.

20 Claims, 6 Drawing Sheets

(51) Int. Cl.
*G08G 1/0968* (2006.01)
*G01C 21/36* (2006.01)

(56) References Cited

U.S. PATENT DOCUMENTS

| | | |
|---|---|---|
| 2005/0207876 A1 | 9/2005 | Springwater |
| 2017/0212511 A1 | 7/2017 | Paiva et al. |
| 2017/0219362 A1 | 8/2017 | Bryson et al. |
| 2017/0365170 A1 | 12/2017 | Nenad et al. |
| 2018/0053417 A1* | 2/2018 | Rolf ................. G08G 1/143 |
| 2018/0170365 A1 | 6/2018 | Haim |
| 2018/0374002 A1* | 12/2018 | Li ..................... G06F 3/017 |
| 2019/0025820 A1* | 1/2019 | Ferguson ............ G08G 1/0175 |

* cited by examiner

NAVIGATION SYSTEM WITH PARKING FACILITY NAVIGATION MECHANISM AND METHOD OF OPERATION THEREOF

CROSS-REFERENCE TO RELATED APPLICATION(S)

This application claims the benefit of U.S. Provisional Patent Application Ser. No. 62/614,055 filed Jan. 5, 2018, and the subject matter thereof is incorporated herein by reference thereto.

TECHNICAL FIELD

An embodiment of the present invention relates generally to a navigation system, and more particularly to a system for autonomous operation of a vehicle.

BACKGROUND

Modern consumer and industrial electronics, especially devices such as graphical navigation systems, cellular phones, vehicle integrated navigation and computing systems, guided navigation system, and autonomous functions for vehicles, and self-driving cars, are providing increasing levels of functionality to support modern life including navigation and route guidance services. Research and development in the existing technologies can take a myriad of different directions.

As users become more empowered with the growth of navigation devices, vehicle based navigation services, and vehicle automation, new and old paradigms begin to take advantage of this new device space. There are many technological solutions to take advantage of this new device capability to enhance or augment navigation and route guidance. For example, autonomous capability of automotive vehicles provides limited support to perform various driving maneuvers. However, users are not provided the option to exit the user vehicle to allow the user vehicle to engage fully in autonomous operation without the presence of the user.

Thus, a need still remains for a navigation system with an autonomous vehicle operation mechanism for traversal of a vehicle parking facility. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a navigation system, including: a control unit configured to: receive a parking facility request for an autonomous vehicle operation of a user vehicle in a vehicle parking facility; retrieve a parking facility map for the vehicle parking facility, including facility information, for the vehicle parking facility, wherein the facility information includes intersection nodes; and generate a facility traversal route for the autonomous vehicle operation of the user vehicle through the vehicle parking facility based on the intersection nodes and the parking facility request.

An embodiment of the present invention provides a method of operation of a navigation system including: receiving a parking facility request for an autonomous vehicle operation of a user vehicle in a vehicle parking facility; retrieving a parking facility map for the vehicle parking facility, including facility information, for the vehicle parking facility, wherein the facility information includes intersection nodes; and generating a facility traversal route for the autonomous vehicle operation of the user vehicle through the vehicle parking facility based on the intersection nodes and the parking facility request.

An embodiment of the present invention provides a non-transitory computer readable medium including instructions executable by a control circuit for a navigation system, the instructions including: receiving a parking facility request for an autonomous vehicle operation of a user vehicle in a vehicle parking facility; retrieving a parking facility map for the vehicle parking facility, including facility information, for the vehicle parking facility, wherein the facility information includes intersection nodes; and generating a facility traversal route for the autonomous vehicle operation of the user vehicle through the vehicle parking facility based on the intersection nodes and the parking facility request.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
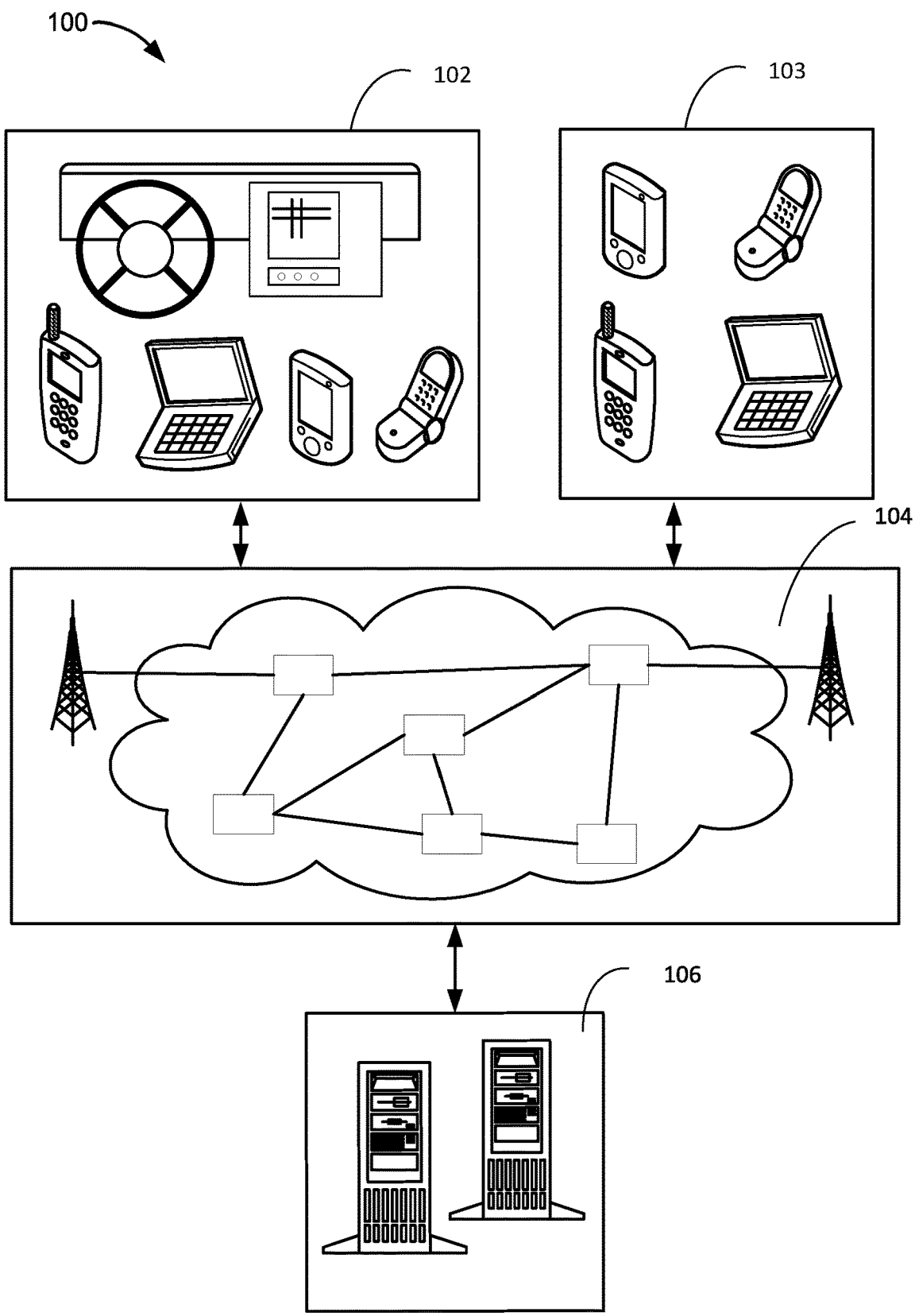
FIG. 1 is a navigation system with route prediction mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a navigation system 100 with an autonomous vehicle operation mechanism in an embodiment of the present invention. The navigation system 100 includes a first device 102, such as a client or a server, a mobile device 103, such as a client device, connected to a second device 106, such as a client or server. The first device 102 can communicate with the second device 106 with a communication path 104, such as a wireless or wired network. The first device 102 and the mobile device 103 can communicate with one another with the communication path 104.

As an example, the first device 102 can be of any of a variety of computing devices, such as a cellular phone, a tablet computer, a smart phone, a notebook computer, vehicle embedded navigation system or computing device. The first device 102 can couple, either directly or indirectly, to the communication path 104 to communicate with the second device 106 or can be a stand-alone device.

As an example, the mobile device 103 can be any of a variety of mobile computing devices, such as a cellular phone, a tablet computer, a smart phone, a notebook computer, or a smart watch. As a specific example, the mobile device 103 can be a vehicle entry device, such as a key that includes computing and communication components, such as processor or microchip, an antenna, or cellular capability. Details of the mobile device 103 will be discussed in detail below.

The second device 106 can be any of a variety of centralized or decentralized computing devices, or sensor instrument or devices to take measurements or record environmental information. For example, the second device 106 can be a multimedia computer, a laptop computer, a desktop computer, a video game console, grid-computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102, the mobile device 103, or a combination thereof.

For illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
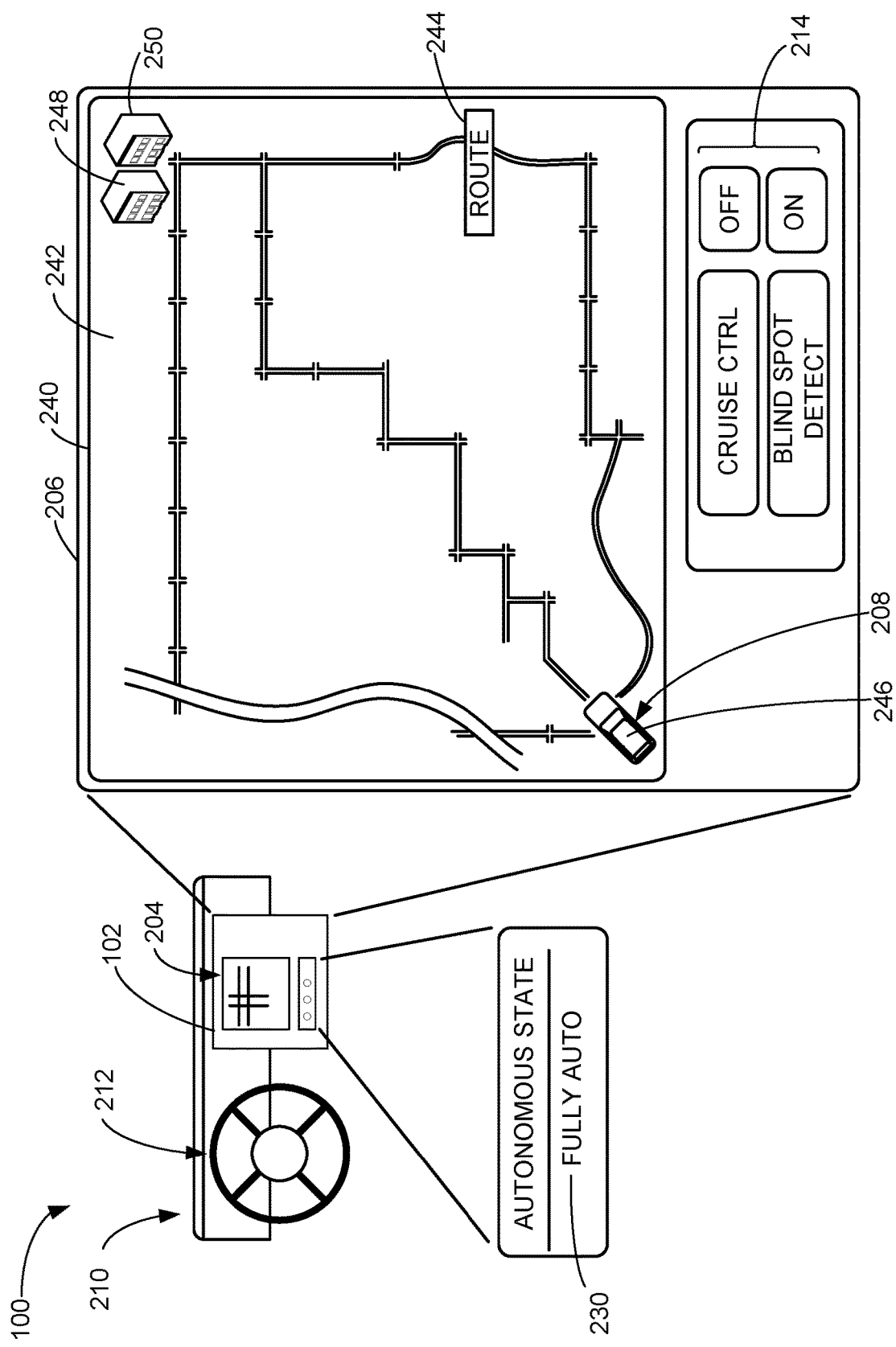
FIG. 2 is an example of a display interface of the first device of FIG. 1.

Referring now to FIG. 2, therein is shown an example of a system interface 204 of the first device 102 of FIG. 1. For illustrative purposes, the navigation system 100 depicts the system interface 204 as part of a system for autonomous operation of a user vehicle 208. As an example, the user vehicle 208 can be a self-propelled road or off-road motorized vehicle. More specifically, the user vehicle 208 can be a passenger vehicle powered by electricity or battery power, petroleum based or other type of chemical fuel, or a hybrid thereof and generally excludes vehicles that operate on rails, such as trains or cable cars. Examples of the user vehicle 208 can include cars, trucks, buses, and vans.

The system interface 204 can be a physical system as part of an attached or embedded vehicle interface of the user vehicle 208, such as a dashboard or center console interface, or a separate standalone device, such as a mobile device, a navigation device, mobile phone, or mobile computing device. As an example, the system interface 204 can be a display interface for the first device 102.

In an implementation of the first device 102 that is integrated with the user vehicle 208, the system interface 204 can include a display interface 206, such as an instrument panel with a touch screen, keypad, other interface components, or a combination thereof. For illustrative purposes, the user vehicle 208 is depicted by a graphical representation on the display interface 206. The first device 102 can include the capability to communicate with the mobile device 103 of FIG. 1, such as through the communication path 104 of FIG. 1

The system interface 204 can provide an interface for a system user (not shown) to interact with an autonomous vehicle operation system 210 of the user vehicle 208. The autonomous vehicle operation system 210 is a system that performs various functions and operations for autonomous control and operation of the user vehicle 208. For example, the autonomous vehicle operation system 210 can perform functions for autonomous driving of the user vehicle 208 and other related operations. As a specific example, the autonomous vehicle operation system 210 can operate the user vehicle 208 through control and operation of essential vehicle control functions 212, non-essential vehicle functions 214, or a combination thereof.

The essential vehicle control functions 212 are functions for driving the user vehicle 208. For example, the essential vehicle control functions 212 can include braking control functions, steering control functions, throttling control functions, or a combination thereof.

The non-essential vehicle functions 214 are functions related to or ancillary to driving of the user vehicle 208. More specifically, the non-essential vehicle functions 214 can be functions or systems that do not control the essential vehicle control functions of user vehicle 208. For example, the non-essential vehicle functions 214 can be supplemental safety systems or convenience systems. Examples supplemental safety systems can include collision warning, lane departure warning, blind spot monitoring. Examples of convenience systems can include automated controls for wipers, headlights, turn signals, or hazard lights.

The autonomous vehicle operation system 210 can control or operate the essential vehicle control functions 212, the non-essential vehicle functions 214, or a combination thereof to engage in a fully autonomous state 230. In the fully autonomous state 230, the autonomous vehicle operation system 210 is capable of performing all safety-critical driving functions and monitors roadway conditions for an entire trip. The fully autonomous state 230 can permit occupied and unoccupied vehicles since safe operation of the user vehicle 208 rests solely on the autonomous vehicle operation system 210. For example, under the fully autonomous state 230 the occupant or system user of the user vehicle 208 can provide destination or navigation input, but is not expected to be available for control of the essential vehicle control functions 212 at any time during the trip. As another example, under the fully autonomous state 230, the navigation system 100 can autonomously operate the user vehicle 208 when the system user or any other occupants are not inside the user vehicle 208.

The system interface 204 can present a navigation map 240. The navigation map 240 is a graphical representation of a geographical area. For example, the navigation map 240 can depict the geographic area of a travel region 242. The travel region 242 is a geographic region spanning an area for travel between two locations. For example, the travel region 242 including a graphical representation of an origin location 246, a graphical representation of a destination location 248, or a combination thereof.

The origin location 246 is a geographic location set as the beginning of travel along a route. For example, the origin location 246 can be the geographic position of the system user (not shown) prior to travel to the destination location 248. For illustrative purposes, the origin location 246 is depicted by a graphical representation of the user vehicle 208, although it is understood that the origin location 246 can be depicted differently. For example, the can be represented as a graphical representation of the current location of the system user, the user vehicle 208, or a combination thereof.

The destination location 248 is a geographic location set as the end of travel along a route. For example, the destination location 248 can be a location that the system user has input into the navigation system 100 for travel to using the user vehicle 208. As a specific example, the navigation map 240 can include travel to a vehicle parking facility 250.

The vehicle parking facility 250 can be a location for parking of vehicles, such as the user vehicle 208. In general, the vehicle parking facility 250 is a facility for parking multiple vehicles and generally precludes driveways or garages for single family homes. For example, the vehicle parking facility 250 can be a location or structure designated for the parking of vehicles, such a parking lot or multi-story parking structure that is publicly or privately accessible, such as at a public transportation hub or retail complex. As a specific example, the vehicle parking structure can be a part of, adjacent to, or near the destination location 248. As a further example, it is understood that there can be multiple instances of the vehicle parking facility 250 at or near the destination location 248.

The navigation system 100 can include the capability to operate the user vehicle 208 in the fully autonomous state 230 in the vehicle parking facility 250. For example, the navigation system 100 can generate instructions for the autonomous vehicle operation system 210 to traverse through the vehicle parking facility 250, search for an available vehicle parking location in the vehicle parking facility 250, instructions to park the user vehicle 208 in the available vehicle parking location, recall the user vehicle 208 from the vehicle parking facility 250, or a combination thereof.

For example, in the case of a request by the system use to park the user vehicle 208 in the vehicle parking facility 250, the system user can stop the user vehicle 208 at a location inside or near the vehicle parking facility 250 and exit the user vehicle 208. To continue the example, the navigation system 100 can generate instruction for the autonomous vehicle operation system 210 in the fully autonomous state 230 to travel to the vehicle parking facility 250, traverse the vehicle parking facility 250 in search for an available parking location, perform a vehicle parking maneuver with the user vehicle 208 when the available parking spot is identified, or a combination thereof. To further the example, in the event the navigation system 100 is unable to find the available parking location in the vehicle parking facility 250 for the user vehicle 208, the navigation system 100 can engage in a patrol mode to continue search for the available parking location. Details regarding the parking of the user vehicle 208 in the vehicle parking facility 250 will be discussed below.

In yet a further example, in the case of a request by the system user to recall the user vehicle 208 from the vehicle parking facility 250, the navigation system 100 can generate a route from the current location of the user vehicle 208 through the vehicle parking facility 250 to meet the system user at a particular location. To further example, the navigation system 100 can generate instructions to operate the user vehicle 230 in the fully autonomous state 230 and drive to a location to meet the system user. Details of the above described functions for recalling the user vehicle 208 will be discussed in detail below.

The navigation system 100 can provide notifications to the system user regarding the status of the user vehicle 208 during autonomous operation in the vehicle parking facility 250. For example, the navigation system 100 can provide a notification when the user vehicle 208 has successfully parked, the location at which the use vehicle 208 has parked, that no available parking locations currently exist if the navigation system 100 is unable to find the available parking location, the travel time to meet the system user during the recall operation, or a combination thereof. As a further example, the navigation system 100 can provide the notification to the system user if the navigation system 100 encounters a situation that the autonomous vehicle operation system 210 is unable to resolve. Each of the above features will be discussed in detail below.

Figure 3:
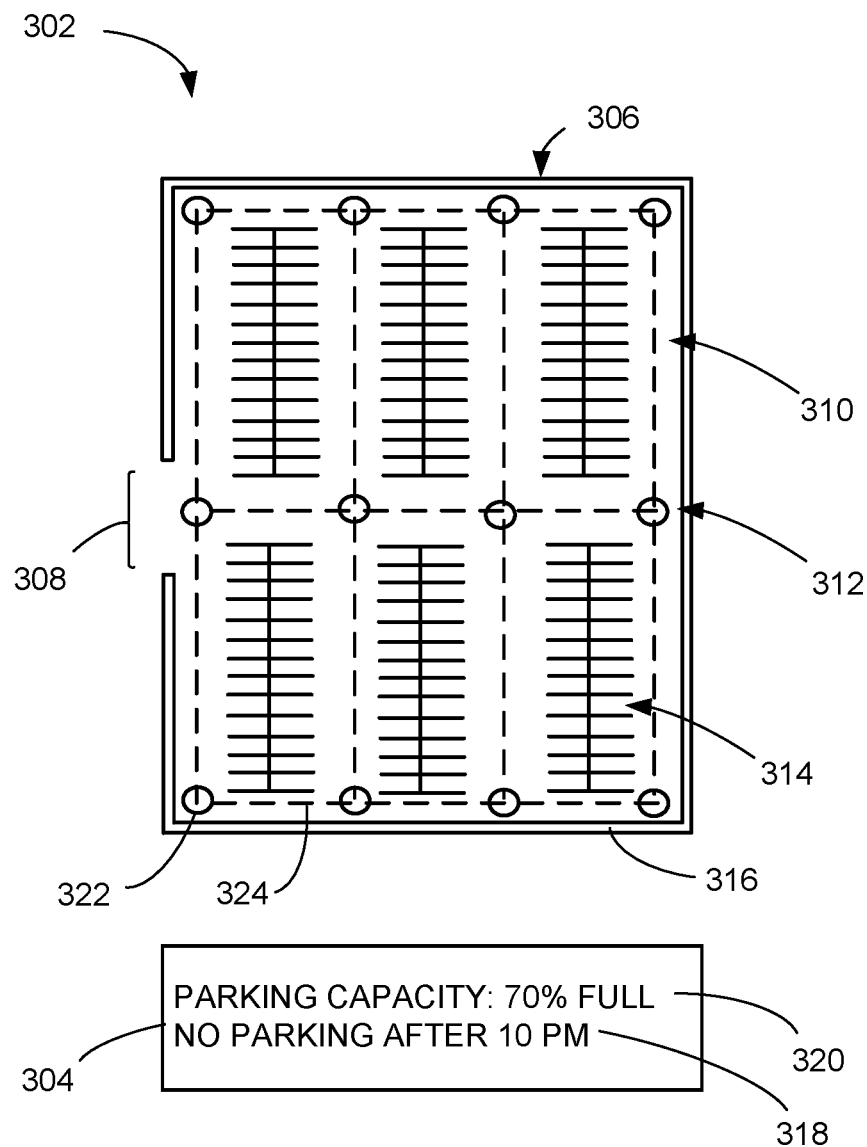
FIG. 3 an example of a parking facility map 302 of the vehicle parking facility of FIG. 2.

Referring no to FIG. 3, therein is shown an example of a parking facility map 302 of the vehicle parking facility 250 of FIG. 2. The parking facility map 302 is a representation of the vehicle parking facility 250. For illustrative purposes, the parking facility map 302 is shown as a two dimensional representation of the vehicle parking facility 250, however, it is understood that the parking facility map 302 can be a three dimensional representation of the vehicle parking facility 250.

The parking facility map 302 can include facility information 304, which are details about the vehicle parking facility 250. For example, the facility information 304 of the vehicle parking facility 250 can include characteristics and attributes of the vehicle parking facility 250, such as facility layout information 306, facility physical feature information 316, facility rules 318, facility statistics 320, or a combination thereof.

The facility layout information 306 is information related to the layout of the vehicle parking facility 250. For example, the facility layout information 306 can be plans, architectural plans, blueprints, computer aided design (CAD) drawings, models, or a combination thereof for the vehicle parking facility 250. As a specific example, the facility layout information 306 can include information for the type of vehicle parking facility 250, such as an open air lot, an underground parking garage, a multi-story or multi-level parking structure, or a combination thereof. As another specific example, the facility layout information 306 can include details about the number and location of facility access locations 308, which are the locations at which vehicle can enter and exit the vehicle parking facility 250, the number of floors, the location of ramps to adjacent levels of the vehicle parking facility 250, locations of vehicle pathways 310, which are travel lanes for vehicle traffic, locations of vehicle pathway intersections, which are the location an intersection between two of the vehicle pathways 310, pedestrian paths, or a combination thereof. In a further specific example, the facility layout information 306 can include information about vehicle parking locations 314, which are designated areas for vehicle parking, such as the number of vehicle parking locations 314, the dimensions of the vehicle parking locations 314 such as width and depth, the orientation or configuration of the vehicle parking locations 314 such as an angled "herringbone" configuration or perpendicular to the direction of traffic.

The facility physical feature information 316 are details regarding physical objects within the vehicle parking facility 250. For example, the facility physical feature information 316 can include the location, shape, dimension, orientation, or a combination thereof for physical objects in the vehicle parking facility 250. Examples of physical objects can include structural support columns, protruding ceiling beams, ducting, pipes, walls, gates, fences, waste bins, sign posts, hanging signs, parking barriers, speed bumps, pylons, curbs, or a combination thereof. In general, the facility physical features are primarily related to the location and dimensions of physical objects that are a part of or integrated with the vehicle parking facility 250.

The facility rules 318 are information pertaining to the restrictions and guidelines for travel and parking within the vehicle parking facility 250. Examples of the facility rules 318 can include parking space restrictions, such as vehicle size or type limitations, designated handicap spaces, reserved spaces, such a for emergency vehicles or particular vehicle types including motorcycles or electric vehicles, areas that prohibit vehicle travel or stopping, time limitations, or a combination thereof. As a further example, the facility rules 318 can also include rules for traffic flow, such as speed limits, mandatory stop locations such as stop sign locations, yield locations such as at pedestrian crossings, lane restrictions such as direction of vehicle travel, or a combination thereof.

The facility statistics 320 are information about occupancy of the vehicle parking facility 250. For example, the facility statistics 320 can include correlations between the number of vehicle parking locations that are occupied and the date and time of day. As another example, the facility statistics 320 can include occupancy probabilities specific to areas or sub-areas of the vehicle parking facility 250. For instance, the areas closer to pedestrian access points, such as elevators or stairwells, can have a higher probability of being occupied compared those further away. Similarly, a ground level parking floor can have a higher probability of being occupied compared to higher floors in a multi-floor type of the vehicle parking facility.

It has been found that, in certain situations, forms of geolocation, such as global positioning system tracking signals, may not be available or unreliable when traversing through certain locations within the vehicle parking locations 314, or certain types of the vehicle parking locations 314, such as large multi-story or underground facilities. Thus the navigation system 100 can use the parking facility map 302 and the facility information 304 to generate instructions for the user vehicle 208 to autonomously traverse through the vehicle parking facility 250. For example, in one implementation, the navigation system 100 can use the facility information 304, such as the facility physical features, as reference and orientation points to perform various driving maneuvers and navigation through the vehicle parking facility 250. Details regarding the use of the parking facility map 302 and the facility information 304 for autonomous operation of the user vehicle 208 through the vehicle parking facility 250 will be discussed below.

In another implementation, the navigation system 100 can use the facility information 304 of the facility layout information 306 to generate a route to traverse through the vehicle parking facility 250 based on intersection nodes 322, node link segments 324, or a combination thereof. The intersection nodes 322 are representations of the vehicle pathway intersections 312 in the vehicle parking facility 250. The node link segments 324 are representations of the vehicle pathways 310 that link between the intersection nodes 322. As an example, the navigation system 100 can, connect the intersection nodes 322 and the node link segments 324 as possible routes to traverse the vehicle parking facility 250. It has been found that generating a route to traverse the vehicle parking facility 250 based on the intersection nodes 322 enables thorough traversal of the vehicle parking facility 250 when searching for a vacant instance of the vehicle parking locations 314. Details regarding generation and use of the intersection nodes 322 and the node link segments 324 of the vehicle parking facility 250 will be discussed in detail below.

Figure 4:
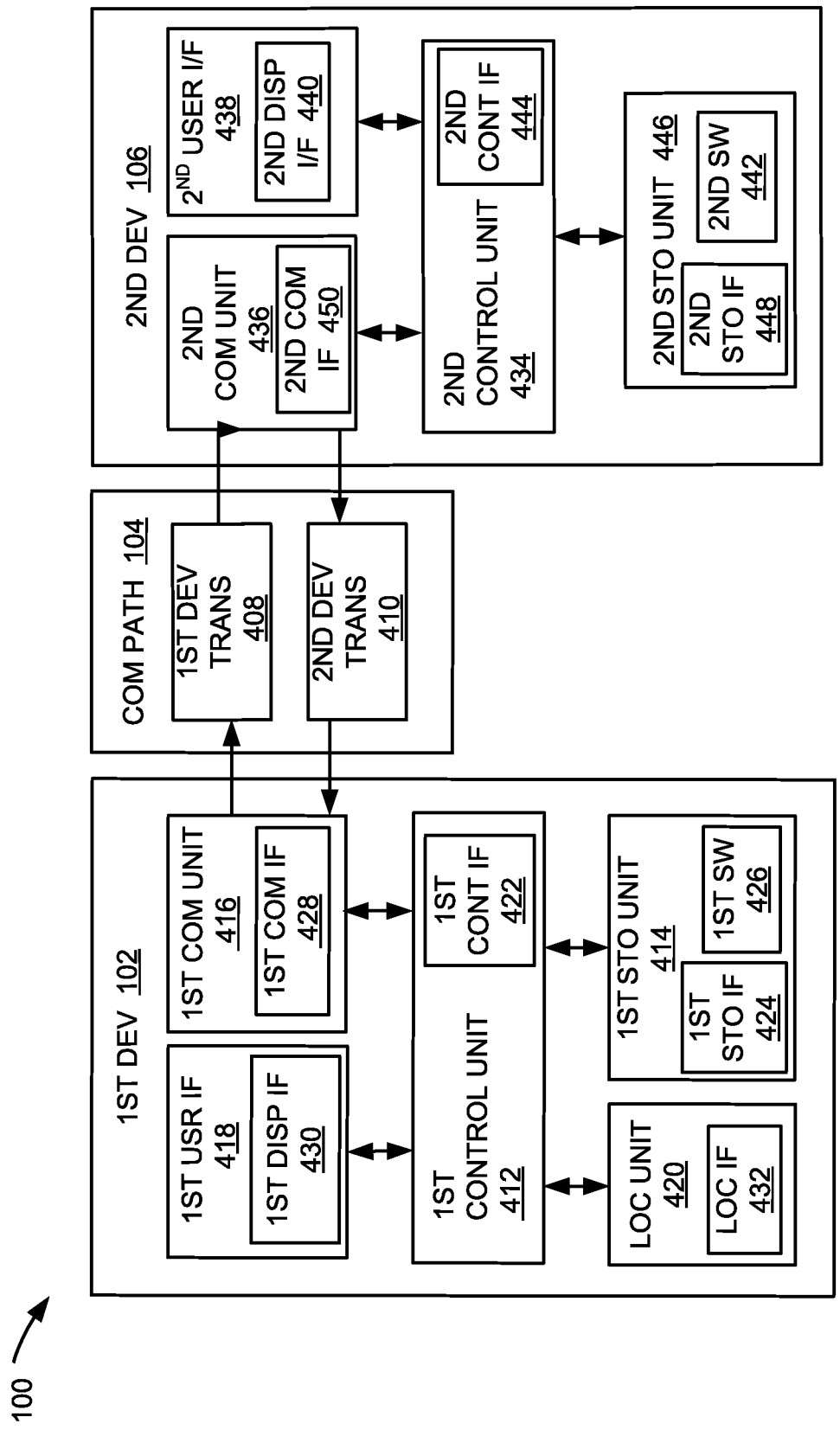
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 412, a first storage unit 414, a first communication unit 416, and a first user interface 418. The first control unit 412 can include a first control interface 422. The first control unit 412 can execute a first software 426 to provide the intelligence of the navigation system 100.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage unit 414 can store the first software 426. The first storage unit 414 can also store the relevant information. For example, first storage unit 414 information for generating the navigation map 240 of FIG. 2

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100. The first control unit 412 can further execute the first software 426 for interaction with the communication path 104 via the first communication unit 416.

The second device 106 can be optimized for implementing an embodiment of the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, softkeys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the information for generating the navigation map 240 of FIG. 2. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof. For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100.

Figure 5:
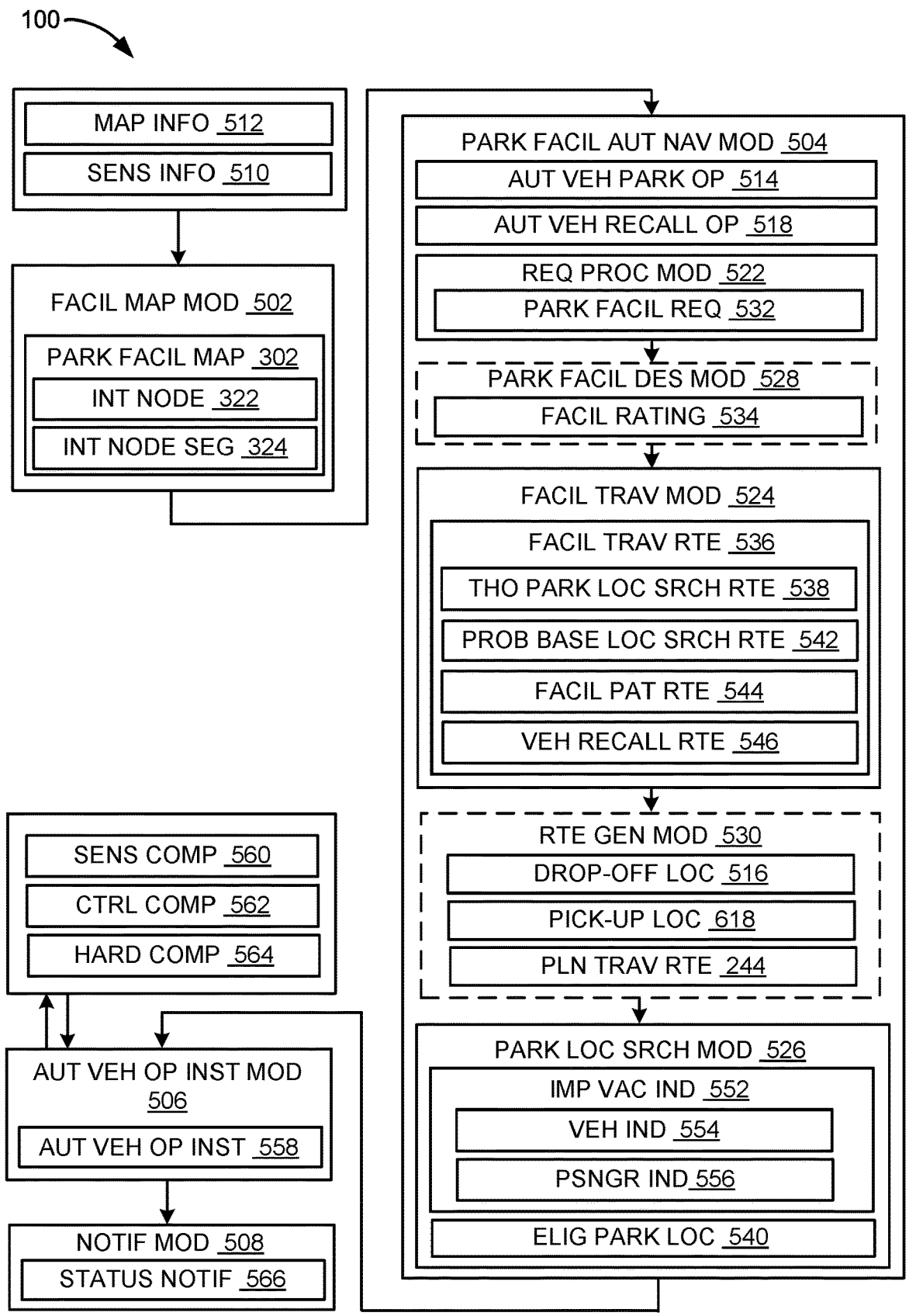
FIG. 5 is a control flow in an embodiment of the navigation system.

Referring now to FIG. 5, therein is shown a control flow of the navigation system 100. In general, the navigation system 100 can generate, supplement, or a combination thereof the parking facility map 302 for the vehicle parking facility 250, utilize the parking facility map 302 to generate instructions for traversing the vehicle parking facility 250, or a combination thereof. The navigation system 100 can implement these functions with a facility mapping module 502, a parking facility autonomous navigation module 504, an autonomous vehicle operation instruction module 506, a notification module 508, or a combination thereof. The parking facility autonomous navigation module 504 can be coupled to the map generation module 402. The autonomous vehicle operation instruction module 506 can be coupled to the parking facility autonomous navigation module 504. The notification module 508 can be coupled to the autonomous vehicle operation instruction module 506.

The facility mapping module 502 is for generating the parking facility map 302, supplementing an existing instance of the parking facility map 302, or a combination thereof for the vehicle parking facility 250. The facility mapping module 502 can generate or supplement the parking facility map 302 based on sensor information 510, map information 512, or a combination thereof.

The sensor information 510 is information determined based on sensor reading, sensor measurements, or a combination thereof. For example, the sensor information 510 can be information received from image capture sensors, cameras, RADAR, SONAR, LIDAR, sound capture devices, microphones, or a combination thereof. As a specific example, the sensor information 510 can be received from a low cost LIDAR system attached to or integrated to a surveillance or mapping vehicle.

The sensor information 510 can include information about the facility physical features of the vehicle parking facility 250. For example, the sensor information 510 for the facility physical features can include the location, shape, dimension, orientation, distance between the features, or a combination thereof for the physical objects in the vehicle parking facility 250, such as structural support columns or beams, walls, waste bins, sign posts, hanging signs, parking barriers, speed bumps, pylons, ramp angles and length, curbs and pedestrian walkways, or a combination thereof.

An example of a specific implementation, the sensor information 510 can be gathered in part by using vehicles equipped with low cost LIDAR driven by human operators to perform surveillance of the vehicle parking facility 250. For instance, the surveillance or mapping vehicle can perform a number of loops through each drivable section of the vehicle parking facility 250. As a specific example, the surveillance or mapping vehicle can conduct at least two loops through the vehicle parking facility 250. The sensor information 510 gathered by the sensor or surveillance vehicle can be analyzed by the facility mapping module 502 to generate the parking facility map 302, which can be store, such as in the first storage unit 414, the second storage unit 446, both of FIG. 3 for future use by the system user or other user. To continue the example implementation, the sensor information 510 for the vehicle parking facility 250 can be complied through crowd sourcing from multiple instances of the surveillance vehicle.

The map information 512 is information representing a geographic area. In general, the map information 512 can include information about travel infrastructure, such as roads, highways, overpasses, railroad tracks and crossings, tunnels, and bridges. The map information 512 can further include details about the road ways, including the number of lanes on the highway, one way streets, divided highways, lane merge sections, lane restrictions such as high occupancy or toll lanes, bicycle lanes, road conditions such as paved or unpaved roads. In another example, the map information 512 can include information about locations, dimensions, and types of manmade structures, such as hospitals, residential buildings, business parks, shopping malls, gas stations and other types of buildings. In a further example, the map information 512 can include information about geographic features, such as terrain, bodies of water, and topography; or a combination thereof.

In the case of the vehicle parking facility 250, the map information 512 can include the facility information 304. More specifically, map information 512 can include the facility layout information 306, the facility physical features information 316, the facility rules 318, or a combination thereof for the facility information 304.

The facility mapping module 502 can receive the map information 512 from various sources. For example, the map generation module 402 can receive the map information 512 from the first storage unit 414 of FIG. 4 of the first device 102, the second storage unit 446 of FIG. 4, or a combination thereof. In another example, the facility mapping module 502 can receive the map information 512 from a device other than the first device 102, such as an external storage unit or server, the second storage unit 414 of FIG. 4, or a combination thereof. As a specific example, the map information 512 can be generated and collected from multiple sources, such as through "crowd sourcing" from one or more other system users that have previously traversed through and collected information for the facility information 304.

In an implementation, the facility mapping module 502 can generate the parking facility map 302 based on the sensor information 510. For example, the facility mapping module 502 can analyze the sensor information 510 to render a map of the location of the facility physical objects, dimensions of the facility physical objects, or a combination thereof. As a specific example, the parking facility map, or portions of the parking facility map generated based on the sensor information 510 that can be a high definition or high resolution map of the vehicle parking facility 250.

In another implementation, the facility mapping module 502 can generate the parking facility map 302 based on a combination of the map information 512 and the sensor information 510. For example, the facility mapping module 502 can cross-reference, cross-verify, superimpose information, or a combination thereof the information from the map information 512 and the sensor information 510.

In a further implementation, the facility mapping module 502 can generate the intersection nodes 322 and node link segments 324 based on the map information 512, the sensor information 510, or a combination thereof. For example, in a particular instance of the vehicle parking facility 250, the facility mapping module 502 can define the intersection nodes 322 as the points or locations where one or more of the vehicle pathways 310 of FIG. 2 intersect. To continue the example, the facility mapping module 502 can validate the node link segments 324 between the intersection nodes 322 based on intersections of shape points derived from the sensor information 510. The shape points can be poly-lines calculated as the centerlines of the vehicle pathways 310 with the sensor information 510 that indicates that a vehicle has previously traversed the vehicle pathways 310. To further the example, if the shape point exists between two of the intersection nodes 322, the facility mapping module 502 can verify that the node link segments 324 is a valid representation of a particular instance of the vehicle pathways 310.

The navigation system 100 can enable autonomous operation of the user vehicle 208 through the vehicle parking facility 250 with the parking facility autonomous navigation module 504. In general, the parking facility autonomous navigation module 504 can implement an autonomous vehicle parking operation 514 and an autonomous vehicle recall operation 518. The autonomous vehicle parking operation 514 is a mode for autonomously operating the user vehicle 208 to navigate through the vehicle parking facility 250 and search for the vehicle parking locations 314. The autonomous vehicle recall operation 518 is a mode for autonomously operating the user vehicle 208 to navigate through and meet the system user at a user pick-up location 520. The user pick-up location is a location at which the user vehicle 208 will meet the system user at the terminus of the autonomous vehicle recall operation 518.

The parking facility autonomous navigation module 504 can implement the autonomous vehicle parking operation 514, the autonomous vehicle recall operation 518, or a combination thereof with a request processing module 522, a facility traversal module 524, a parking location search module 526, or a combination thereof. Under applicable circumstances, the parking facility autonomous navigation module 504 can optionally include a parking facility designation module 528, a facility route generation module 530, or a combination thereof. Each of these functions will be discussed in detail below.

The parking facility autonomous navigation module 504 can initiate the autonomous vehicle parking operation 514 and the autonomous vehicle recall operation 518 with a request processing module 522. The request processing module 522 is for determining an objective of a parking facility request 532 from the system user. The parking facility request 532 is a request for autonomous operation of the user vehicle 208 through the vehicle parking facility 250. More specifically, the parking facility request 532 can be a request to initiate the autonomous vehicle parking operation 514 or the autonomous vehicle recall operation 518. As an example, the parking facility request 532 can be initiated by the system user from a user drop-off location 516, which is the location at which the system user exits the user vehicle 208 and initiates the autonomous vehicle parking operation 514.

The parking facility request 532 can be an explicit request or an implied request by the system user. An example of the explicit instance of the parking facility request 532 can be through verbal communication with the navigation system 100 or activation through the first device 102, the mobile device 103, or a combination thereof to initiate the autonomous vehicle parking operation 514 or the autonomous vehicle recall operation 518. An example of the implied instance of the parking facility request 532 can involve monitoring the actions of the system user based on the location of the user vehicle 208. As a specific example, the implied instance of the parking facility request 532 can be detected when the system user stops the user vehicle 208 near or inside the vehicle parking facility 250 and exits the user vehicle 208 while the user vehicle 208 is still engaged or running.

The parking facility autonomous navigation module 504 can optionally include the parking facility designation module 528. For example, In the event that the system user has not explicitly selected an instance of the vehicle parking facility 250, such as when the system user initiates the autonomous vehicle parking operation 514 at a location outside of the vehicle parking facility 250, or when multiple instances of the vehicle parking facility exist near the user drop-off location 516 of the system user, the parking facility designation module 528 can select an instance of the vehicle parking facility 250 in which to engage in the autonomous vehicle parking operation 514.

In an implementation, the parking facility designation module 528 can select the vehicle parking facility 250 based on a facility rating 534 of the vehicle parking facility 250. The facility rating 534 is a rating of ease by which an autonomously operated vehicle can traverse through the vehicle parking facility 250. For example, the facility rating 534 can be a measure of difficulty for the autonomously operated vehicle's to engage in parking in the vehicle parking facility based on obstacles, such as the amount and frequency of pedestrian traffic, the width of the vehicle pathways 310 of FIG. 3, the dimensions or size of the vehicle parking locations 314, or a combination thereof. As another example, the facility rating 534 can based on the ease of finding an available instance of the vehicle parking locations 314, such as total number of the vehicle parking locations 314.

In another implementation, the parking facility designation module 528 can use the facility rating 534 to determine whether the vehicle parking facility 250 is suitable for autonomous parking by the autonomous vehicle operation system 210 of the user vehicle 208 based on a facility threshold. The facility threshold is a metric of the autonomous capability of the user vehicle 208. As an example, if the facility score is above the facility threshold, then the autonomous vehicle operation system 210 can be capable of navigating through the vehicle parking facility 250. If the facility rating is below the facility threshold, then the autonomous vehicle operation system 210 can be incapable of safely navigating through the vehicle parking facility 250. In general, a lower value of the facility threshold can correlate with a high autonomous capability of the autonomous vehicle operation system 210 to navigate through the vehicle parking facility 250 and a high value of the facility threshold can correlate with a low autonomous capability of the autonomous vehicle operation system 210 to navigate through the vehicle parking facility 250.

The control flow can pass from the request processing module 522 to the facility traversal module 524. The facility traversal module 524 is for generating a facility traversal route 536 through the vehicle parking facility 250. The facility traversal route 536 is a route that the user vehicle 208 can follow when traversing through the vehicle parking facility 250. The facility traversal module 524 can generate the facility traversal route 536 to meet the parking facility request 532 of the autonomous vehicle parking operation 514 or the autonomous vehicle recall operation 518. The facility traversal module 524 can generate the facility traversal route 536 for the autonomous vehicle parking operation 514 and the autonomous vehicle recall operation 518 based on the intersection nodes 322 of the parking facility map 302.

In one implementation, for the autonomous vehicle parking operation 514, the facility traversal module 524 can generate the facility traversal route 536 as a thorough parking location search route 538. The thorough parking location search route 538 maximizes the number of the vehicle parking locations 314 that are checked as an eligible parking location 540 based on the intersection nodes 322. The eligible parking location 540 is an unoccupied instance of the vehicle parking locations 314 without a restriction that would prevent parking of the user vehicle 208 in the vehicle parking locations 314.

As an example, to ensure that the facility traversal route 536 thoroughly searches the vehicle parking facility 250 and does not repeat loops through the same sections of the vehicle parking facility 250, for the thorough parking location search 538, the facility traversal module 524 can generate the facility traversal route 536 to minimize the number of times the facility traversal route 536 passes through a particular instance of the intersection nodes 322. For instance, the facility traversal module 524 can generate the thorough parking location search route 538 to pass through the intersection nodes 322 only as many times as are necessary to ensure that each of the vehicle pathways 310 that includes the vehicle parking locations 314 are traversed. As a specific example, the facility traversal module 524 can generate the thorough parking location search route 538 with the intersection nodes 322 of the vehicle parking facility 250 as nodes in a directed acyclic graph. To continue the specific example, the thorough parking location search route 538 can have the goal of traversing each of the node link segments 324 connected to each of the intersection nodes 322.

The thorough parking location search route 538 can be the default option for generating the facility traversal route 536, although it is understood that the facility traversal module 524 can generate the facility traversal route 536 differently. For example, in another implementation, the facility traversal module 524 can generate the facility traversal route 536 as a probability based location search route 542. The probability based location search route 542 is the facility traversal route 536 that directs the user vehicle 208 to areas of the vehicle parking facility 250 that can have a higher probability of having the eligible parking location 540.

As an example, the facility traversal module 524 can generate the probability based location search route 542 to travel through the fewest number of the intersection nodes 322 to reach areas of the vehicle parking facility 250 with the higher probability of identifying the eligible parking location 540 based on the facility statistics 320 of the facility information 304.

In the situation that no instances of the eligible parking location 540 is found, such as after a throughout search through the vehicle parking facility 250, the facility traversal module 524 can generate a facility patrol route 544. The facility patrol route 544 is an instance of the facility traversal route 536 that can repeatedly loop through one or more areas of the vehicle parking facility 250. For example, the facility traversal module 524 can generate the facility patrol route 544 by selecting a number of the intersection nodes 322 with the node link segments 324 that form loop through an area of the vehicle parking facility 250.

For the parking facility request 532 of the autonomous vehicle recall operation 518, the facility traversal module 524 can generate the facility traversal route 536 as a vehicle recall route 546. The vehicle recall route 546 is an instance of the facility traversal route 536 that recalls the user vehicle 208 from its current position in the vehicle parking facility 250 at the time the parking facility request 532 was made. For example, the facility traversal module 524 can generate the vehicle recall route 546 from the vehicle parking locations 314 that the user vehicle 208 is occupying at the time the parking facility request 532 was made. As another example, the facility traversal module 524 can generate the vehicle recall route 546 with a route terminus for the vehicle recall route 546 as the user pick-up location 520, which can be within the vehicle parking facility 250 or outside the vehicle parking facility 250. In general, facility traversal module 524 can generate the vehicle recall route 546 to traverse the fewest number of the intersection nodes 322 to reach the route terminus.

The parking facility autonomous navigation module 504 can optionally include the route generation module 530. The route generation module 530 is for generating the planned travel route 244. In general, the route generation module 530 can generate the travel route from the origin location 246 of FIG. 2 to the destination location 248 of FIG. 2, which can include generating the planned travel route 244 of FIG. 2 to and from the vehicle parking facility 250. For example, the route generation module 530 can generate the planned travel route 244 to and from the vehicle parking facility 250 when the user drop-off location 516, the user pick-up location 520, or a combination thereof is outside the vehicle parking facility 250. More specifically, the route generation module 530 can generate the planned travel route 244 from the user drop-off location 516 to one of the facility access locations 308 of the vehicle parking facility 250, or generate a route from one of the facility access locations 308 to the user pick-up location 520. The user drop-off location 516 is the geographic location where the system user exits the user vehicle 208, the location where the system user submits the parking facility request 532, or a combination thereof. The user pick-up location 520 is the geographic location of where the system user will meet the user vehicle 208 following the parking facility request 532 with the parking facility request 532 for the autonomous vehicle recall operation 518.

The parking facility autonomous navigation module 504 can include the parking location search module 526 to identify a location to park the user vehicle 208. The parking location search module 526 can determine whether the location is an occupied parking location, which is one of the vehicle parking locations 314 that is occupied by a parked vehicle, or a vacant parking location, which is one of the vehicle parking locations 314 that is not occupied by a parked vehicle. For example, the parking location search module 526 can analyze the sensor information 510 with pattern and shape recognition to determine whether the vehicle parking locations 314 is or is not occupied by another vehicle.

If the parking location search module 526 determines that the instance of the vehicle parking locations 314 is the vacant parking location, the parking location search module 526 can verify that the vacant parking location is the eligible parking location 540 and the autonomous vehicle operation instruction module 506 can generate instructions for the user vehicle 208 to engage in the vehicle parking maneuver. More specifically, the parking location search module 526 can determine that the vacant parking location is the eligible parking location 540 by checking the facility rules 318 of the facility information 304 for the vacant parking location to verify that the user vehicle 208 meets any existing limitations.

In an optional implementation, the parking location search module 526 can identify whether one or more of the occupied parking location may soon be available based monitoring on impending vacancy indicators 552. The impending vacancy indicators 552 are events or actions that indicate that the occupied parking location may soon be the vacant parking location. As an example, the impending vacancy indicators 552 can be vehicle indicators 554, passenger indicators 556, or a combination thereof.

The vehicle indicators 554 are the impending vacancy indicators 552 associated with vehicles that are in the occupied parking location. Examples of the vehicle indicators 554 can be the sound of a vehicle engine starting or activation of reverse lights of vehicles that is in the occupied parking location.

The passenger indicators 556 are the impending vacancy indicators 552 associated with potential vehicle occupants. Examples of the passenger indicators 556 can be individuals getting into a vehicle in the occupied parking location, individuals loading cargo into the vehicle in the occupied parking location, or a combination thereof. As another example, the parking location search module 526 can monitor for the passenger indicators 556 by tracking the movement and travel path of pedestrians through the vehicle parking facility 250. More specifically, the parking location search module 526 can track movement of pedestrians towards vehicles in the occupied parking location, people with full shopping carts or carrying grocery bags, or a combination thereof.

In another optional implementation, the parking location search module 526 can interact with pedestrians, through a speaker system attached to or integrated with the user vehicle 208, to determine whether the pedestrians are moving towards a vehicle to leave the vehicle parking facility 250 or if they have just parked their vehicle and will not be driving out of the vehicle parking facility 250.

When the parking location search module 526 verifies that the occupied parking location will be vacated, the navigation system 100 can generate instructions to signal intent to move the user vehicle 208 into the vehicle parking locations 314, such as through operating the vehicle turn signals, maneuver the user vehicle 208 to a position to allow the vehicle currently occupying the vehicle parking locations 314 to vacate the vehicle parking locations 314, engaged in the vehicle parking maneuver, or a combination thereof before initiating the vehicle parking maneuver.

In another optional implementation, in the event that the parking location search module 526 is unable to identify the eligible parking location 540, the autonomous parking module 406 can engage in an unauthorized parking mode. The unauthorized parking mode is a mode for operating the user vehicle 208 to stop or park in a location that is not designated for vehicle parking. For example the areas that are not designated for vehicle parking can be areas, such as in front of a garbage dumpster or in a position that blocks other parked vehicles. In the unauthorized parking mode, the navigation system 100 can broadcast or display an intent that the user vehicle 208 is temporarily stopped at the current location, such as by using hazard lights, displaying externally visible a visual message or audio cues. Further, in the unauthorized parking mode, the engine or motor of the user vehicle 208 can remain active or running such that the autonomous vehicle operation system 210 can move the user vehicle 208 from the current position, such as when a parked vehicle that is obstructed or blocked by the user vehicle 208.

The control flow can pass from the parking facility autonomous navigation module 504 to the autonomous vehicle operation instruction module 506. The autonomous vehicle operation instruction module 506 is for generating instructions to autonomously operate the user vehicle 208. More specifically, the autonomous vehicle operation instruction module 506 can generate autonomous vehicle operation instructions 558 for autonomous operation of the user vehicle 208 through the vehicle parking facility 250 to follow the facility traversal route 536. The autonomous vehicle operation instructions 558 are instructions to control functions of the user vehicle 208 to autonomously perform various driving maneuvers with the user vehicle 208. For example, the autonomous vehicle operation instructions 558 can be instructions to perform the driving maneuvers with the essential vehicle control functions 212, the non-essential vehicle functions 214, or a combination thereof. More specifically, the autonomous vehicle operation instructions 558 can include instructions to operate sensor components 560 of the user vehicle 208, control components 562 of the user vehicle 208, hardware components 564 of the user vehicle 208, or a combination thereof to perform the driving maneuvers with the essential vehicle control functions 212, the non-essential vehicle functions 214, or a combination thereof.

The sensor components are sensors or instruments to detect, record, observe, or a combination thereof environmental conditions surrounding the user vehicle 208. For example, the sensor components can include various sensors operable to identify a condition associated with and around the user vehicle 208. The sensor components can include sensors such as imagery sensors, RADAR, SONAR, LIDAR, sound capture devices, microphones, or a combination thereof.

The control components are components for processing input and generating output for operating the autonomous functions of the user vehicle 208. For example, the control components can process information from the sensor components and provide instructions to the hardware components to perform the essential vehicle control functions 212, the non-essential vehicle functions 214, or a combination thereof. The control components can include a combination of hardware, such as the first control unit 316 of FIG. 3, the first storage unit 314 of FIG. 3, the first communication unit 316 of FIG. 3, and software, such as the first software of FIG. 3, which can include control algorithms for processing information from the sensor components and generating the instructions.

The hardware components are the physical devices or components for controlling the mechanisms in the user vehicle 208. For example, the hardware components can include wiring, circuitry or other connections, actuators, or a combination thereof for controlling steering, braking, throttling, or a combination thereof for the user vehicle 208.

As examples, the autonomous vehicle operation instruction module 506 can generate autonomous vehicle operation instructions 226 to perform the driving maneuvers with the essential vehicle control functions 224. For example, autonomous vehicle operation instructions 226 can be commands to manipulate mechanical and electronic systems in the user vehicle 208 in order to execute the driving maneuvers, such as distance control, speed control, acceleration, braking, or turning. As specific examples, the autonomous vehicle operation instruction module 506 can generate the autonomous vehicle operation instructions 558 to manage follow distance from other vehicles, control vehicle speed, avoiding pedestrians and obstacles, such as shopping carts, and other vehicles moving through the vehicle parking facility.

In the case of the parking maneuver, the autonomous vehicle operation instruction module 506 generate the autonomous vehicle operation instructions 558 to operate the sensor components 560 to identify the eligible parking location 540, the hardware components and the control components to perform the essential vehicle operation functions 212, the non-essential vehicle functions, or a combination thereof to engage in the parking maneuver to move the user vehicle 208 into the eligible parking location 540.

The control flow can pass from the autonomous vehicle operation instruction module 506 to the notification module 508. The notification module 508 is for generating and providing a status notification 566 to the system user. The status notification 566 is a notification to the system user regarding the status of the user vehicle 208 for the autonomous vehicle parking operation 514, the autonomous vehicle recall operation 518, or a combination thereof. For example, the notification module 408 can provide the status notification 566 with real time updates about the location and current operation of the user vehicle 208. As specific examples, the status notification 566 can include information, such as the current location of the user vehicle 208, when the user vehicle 208 has successfully parked in the vehicle parking facility 250, the location of the eligible parking location 540 of the user vehicle 208, if the navigation system 100 is unable to find the eligible parking location 540, if the user vehicle 208 has encountered a situation that the autonomous vehicle operation system cannot resolve, a situation that requires resolution by the system user, or a combination thereof.

The notification module 408 can optionally enable the system user to monitor the user vehicle 208 and remotely communicate with people around the user vehicle 208 during the autonomous operation of the user vehicle 208 while traveling in the vehicle parking facility 250. As an example, monitoring of the user vehicle can include providing a real time or live video feed, audio feed, or combination thereof of the surroundings of the user vehicle 208, which can be provided through the mobile device 103. In a further example, the remote communication can include external speakers, cameras, and microphones attached to or integrated with the user vehicle that allow the system user to interact with people surrounding the user vehicle.

It has been discovered that the navigation system 100 provides improved operation safety of the user vehicle 208. It has been found that up to 20% of accidents between vehicles occur in the vehicle parking facility 250. Allowing the navigation system 100 to engage in the fully autonomous state 230 while searching for parking, parking the user vehicle 208, or a combination thereof can reduce or eliminate accidents, thus improving operation safety of the user vehicle 208.

It has been further discovered that the navigation system 100 provides improved system user efficiency. The navigation system 100 can eliminate the need for the system user to operate the user vehicle 208 to find the parking spot within the vehicle parking facility 250, which can save the system user time, thus improving system user efficiency.

The navigation system 100 has been described with module functions or order as an example. The navigation system 100 can partition the modules differently or order the modules differently. For example the parking facility autonomous navigation module 504 can be coupled directly to the facility traversal module 524.

The modules described in this application can be hardware implementation or hardware accelerators in the first control unit 416 of FIG. 4 or in the second control unit 438 of FIG. 4. The modules can also be hardware implementation or hardware accelerators within the first device 102 or the second device 106 but outside of the first control unit 416 or the second control unit 438, respectively, as depicted in FIG. 4. However, it is understood that the first control unit 416, the second control unit 438, or a combination thereof can collectively refer to all hardware accelerators for the modules.

The modules described in this application can be implemented as instructions stored on a non-transitory computer readable medium to be executed by a first control unit 412, the second control unit 436, or a combination thereof. The non-transitory computer medium can include the first storage unit 414 of FIG. 4, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
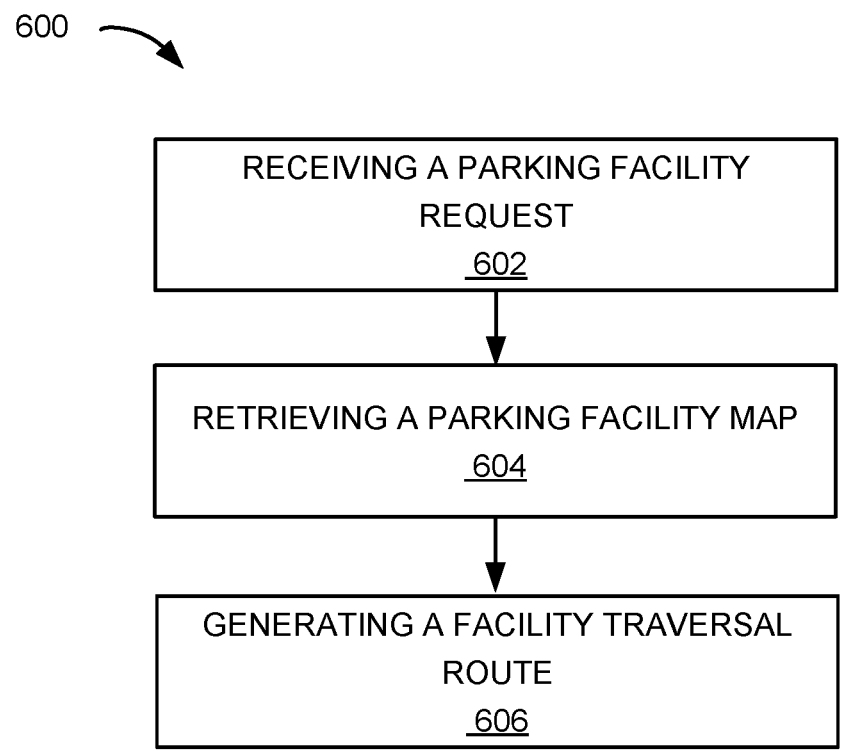
FIG. 6 is flow chart of a method of operation of a navigation system in an embodiment of the present invention.

Referring now to FIG. 6, therein is shown a flow chart of a method 600 of operation of a navigation system 100 in an embodiment of the present invention. The method 600 includes: receiving a parking facility request for an autonomous vehicle operation of a user vehicle in a vehicle parking facility in a block 602; retrieving a parking facility map for the vehicle parking facility, including facility information, for the vehicle parking facility, wherein the facility information includes intersection nodes in a block 604; and generating a facility traversal route for the autonomous vehicle operation of the user vehicle through the vehicle parking facility based on the intersection nodes and the parking facility request in a block 606.

The resulting method, process, apparatus, device, product, and/or system is cost-effective, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
a control unit configured to:
receive a parking facility request for an autonomous vehicle operation of a user vehicle in a vehicle parking facility;
retrieve a parking facility map for the vehicle parking facility, including facility information, for the vehicle parking facility, wherein the facility information includes intersection nodes; and
generate a facility traversal route for the autonomous vehicle operation of the user vehicle through the vehicle parking facility based on the intersection nodes and the parking facility request.

2. The system of claim 1, wherein the control unit is configured to generate the facility traversal route as a thorough parking location search route based on the parking facility request to initiate an autonomous vehicle parking operation.

3. The system of claim 1, wherein the control unit is configured to generate the facility traversal route as a probability based location search route based on the parking facility request to initiate an autonomous vehicle parking operation.

4. The system of claim 1, wherein the control unit is configured to generate the facility traversal route as a facility patrol route based on the parking facility request to initiate an autonomous vehicle parking operation.

5. The system of claim 1, wherein the control unit is configured to generate the facility traversal route as a vehicle recall route based on the parking facility request to initiate an autonomous vehicle recall operation.

6. The system of claim 1, wherein the control unit is configured to generate the parking facility map, including the intersection nodes based on sensor information, map information, or a combination thereof.

7. The system of claim 1, wherein the control unit is configured to identify an eligible parking location, based on the facility information, for parking of the user vehicle in the vehicle parking facility.

8. A method of operation of a navigation system comprising:
receiving a parking facility request for an autonomous vehicle operation of a user vehicle in a vehicle parking facility;
retrieving a parking facility map for the vehicle parking facility, including facility information, for the vehicle parking facility, wherein the facility information includes intersection nodes; and
generating a facility traversal route for the autonomous vehicle operation of the user vehicle through the vehicle parking facility based on the intersection nodes and the parking facility request.

9. The method of claim 8, wherein generating the facility traversal route includes generating the facility traversal route as a thorough parking location search route based on the parking facility request to initiate an autonomous vehicle parking operation.

10. The method of claim 8, wherein generating the facility traversal route includes generating the facility traversal route as a probability based location search route based on the parking facility request of to initiate autonomous vehicle parking operation.

11. The method of claim 8, wherein generating the facility traversal route includes generating the facility traversal route as a facility patrol route based on the parking facility request to initiate an autonomous vehicle parking operation.

12. The method of claim 8, wherein generating the facility traversal route includes generating the facility traversal route as a vehicle recall route based on the parking facility request to initiate an autonomous vehicle recall operation.

13. The method of claim 8, further comprising generating the parking facility map, including the intersection nodes, based on sensor information, map information, or a combination thereof.

14. The method of claim 8, further comprising identify an eligible parking location for parking of the user vehicle, based on the facility information, in the vehicle parking facility.

15. A non-transitory computer readable medium including instructions executable by a control circuit for a navigation system, the instructions comprising:
receiving a parking facility request for an autonomous vehicle operation of a user vehicle in a vehicle parking facility;
retrieving a parking facility map for the vehicle parking facility, including facility information, for the vehicle parking facility, wherein the facility information includes intersection nodes; and
generating a facility traversal route for the autonomous vehicle operation of the user vehicle through the vehicle parking facility based on the intersection nodes and the parking facility request.

16. The non-transitory computer readable medium as claimed in claim 15, wherein generating the facility traversal route includes generating the facility traversal route as a thorough parking location search route based on the parking facility request to initiate an autonomous vehicle parking operation.

17. The non-transitory computer readable medium as claimed in claim 15, wherein generating the facility traversal route includes generating the facility traversal route as a probability based location search route based on the parking facility request to initiate an autonomous vehicle parking operation.

18. The non-transitory computer readable medium as claimed in claim 15, wherein generating the facility traversal route includes generating the facility traversal route as a facility patrol route based on the parking facility request to initiate an autonomous vehicle parking operation.

19. The non-transitory computer readable medium as claimed in claim 15, wherein generating the facility traversal route includes generating the facility traversal route as a vehicle recall route based on the parking facility request to initiate an autonomous vehicle recall operation.

20. The non-transitory computer readable medium as claimed in claim 15, further comprising generating the parking facility map, including the intersection nodes, based on sensor information, map information, or a combination thereof.

* * * * *